(12) United States Patent
Morita et al.

(10) Patent No.: US 9,287,046 B2
(45) Date of Patent: Mar. 15, 2016

(54) MULTI-LAYER CERAMIC CAPACITOR

(71) Applicant: TAIYO YUDEN CO., LTD., Taito-ku, Tokyo (JP)

(72) Inventors: Koichiro Morita, Takasaki (JP); Tetsuo Shimura, Takasaki (JP); Kunihiko Nagaoka, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/389,287

(22) PCT Filed: Nov. 13, 2012

(86) PCT No.: PCT/JP2012/079421
§ 371 (c)(1),
(2) Date: Sep. 29, 2014

(87) PCT Pub. No.: WO2013/145421
PCT Pub. Date: Oct. 3, 2013

(65) Prior Publication Data
US 2015/0036264 A1 Feb. 5, 2015

(30) Foreign Application Priority Data

Mar. 30, 2012 (JP) ................................ 2012-079485

(51) Int. Cl.
*H01G 4/10* (2006.01)
*H01G 4/12* (2006.01)
(Continued)

(52) U.S. Cl.
CPC .............. *H01G 4/20* (2013.01); *C04B 35/4682* (2013.01); *C04B 35/64* (2013.01); *H01G 4/10* (2013.01); *H01G 4/1227* (2013.01);
(Continued)

(58) Field of Classification Search
CPC ........................... H01G 4/1227; C04B 35/4682
See application file for complete search history.

(56) References Cited

U.S. PATENT DOCUMENTS 8,107,219 B2 * 1/2012 Yamaguchi ............ B82Y 30/00
361/321.2
8,203,825 B2 * 6/2012 Azuma ............... C04B 35/4982
361/311

(Continued)

FOREIGN PATENT DOCUMENTS

JP   H09-270366 A   10/1997
JP   2003-077754 A   3/2003

(Continued)

OTHER PUBLICATIONS

International Search Report (ISR) mailed Jan. 8, 2013, issued for International application No. PCT/JP2012/079421.

*Primary Examiner* — Karl Group
(74) *Attorney, Agent, or Firm* — Law Office of Katsuhiro Arai

(57) ABSTRACT

A multi-layer ceramic capacitor has a structure where its dielectric layers are constituted by a sintered compact that contains a mol of $ReO_{3/2}$, b mol of $SiO_2$, c mol of $MO_x$, d mol of $ZrO_2$, and e mol of MgO (where Re is a rare earth element, M is a metal element (except for Ba, Ti, Re, Si, Zr, Mg, and rare earth elements), and x is a valance) per 100 mol of $BaTiO_3$, and a, b, c, d, and e mentioned above which indicate the mol numbers of respective constituents per 100 mol of $BaTiO_3$ are $0.1 \leq a \leq 1.0$, $0.1 \leq b \leq 1.5$, $0.1 \leq c \leq 0.4$, $0 \leq d \leq 1.0$, and $0 \leq e \leq 0.03$, respectively.

18 Claims, 6 Drawing Sheets

(51) Int. Cl.
*C04B 35/468* (2006.01)
*H01G 4/20* (2006.01)
*C04B 35/64* (2006.01)
*H01G 4/224* (2006.01)

(52) U.S. Cl.
CPC ............ *H01G 4/1236* (2013.01); *H01G 4/224* (2013.01); *C04B 2235/3206* (2013.01); *C04B 2235/3224* (2013.01); *C04B 2235/3225* (2013.01); *C04B 2235/3239* (2013.01); *C04B 2235/3244* (2013.01); *C04B 2235/3262* (2013.01); *C04B 2235/3418* (2013.01); *C04B 2235/5445* (2013.01); *C04B 2235/6025* (2013.01); *C04B 2235/658* (2013.01); *C04B 2235/6584* (2013.01); *C04B 2235/663* (2013.01); *C04B 2235/781* (2013.01); *C04B 2235/785* (2013.01)

(56) References Cited

U.S. PATENT DOCUMENTS

| | | | |
|---|---|---|---|
| 2007/0135294 A1 | 6/2007 | Hiramatsu et al. | |
| 2010/0046140 A1* | 2/2010 | Yamaguchi | B82Y 30/00 361/321.4 |
| 2010/0128414 A1* | 5/2010 | Azuma | C04B 35/4682 361/313 |
| 2011/0205686 A1 | 8/2011 | Yamaguchi | |

FOREIGN PATENT DOCUMENTS

| | | |
|---|---|---|
| JP | 2006-173352 A | 6/2006 |
| JP | 2009-224569 A1 | 10/2009 |
| JP | 2010-180124 A | 8/2010 |
| JP | 2011-173747 A | 9/2011 |

* cited by examiner

MULTI-LAYER CERAMIC CAPACITOR

This application is the U.S. National Phase under 35 U.S.C. §371 of International Application PCT/JP2012/079421, filed Nov. 13, 2012, which claims priority to Japanese Patent Application No. 2012-079485, filed Mar. 30, 2012. The International Application was published under PCT Article 21(2) in a language other than English.

TECHNICAL FIELD

The present invention relates to a multi-layer ceramic capacitor (MLCC) that achieves smaller size and larger capacitance through high-density layering of dielectric layers.

BACKGROUND ART

As mobile phones and other digital electronic devices become increasingly smaller and thinner, the need for chips that are smaller yet offering larger capacitance is increasing every year for the multi-layer ceramic capacitors (MLCC) installed on the electronic circuit boards of these devices. In general, reducing the capacitor size inevitably reduces the area of the internal electrodes facing the dielectric layers, which in turn decreases the capacitance. To make sure the capacitor has sufficient capacitance to permit use of a smaller chip, high-density layering technology is crucial that reduces the thickness of the dielectric layers to be provided between the internal electrodes and also allows for layering of many of these dielectric layers.

To increase the density of dielectric layers in a multi-layer ceramic capacitor by making them thinner, one possible way is to minimize the grain size of the primary constituent of dielectrics, such as $BaTiO_3$ (barium titanate). However, making the grain size of dielectrics finer to reduce the thickness of the dielectric layer causes the dielectric constant to drop due to the sizing effect, making it impossible for the capacitor as a whole to provide sufficient capacitance. In the field of high-density layering for ceramic capacitors, therefore, technology is adopted to sinter a fine powder of dielectrics to grow the grain size and thereby prevent the dielectric constant from dropping and consequently ensure sufficient capacitance.

According to Patent Literature 1, for example, a specific dielectric constant of 6000 or more can be achieved by adjusting to a range of 0.1 to 0.2 μm the grain size of the material powder, or specifically $Ba_{1-x}Ca_xTiO_3$ (also referred to as "BCT") which is $BaTiO_3$ partially substituted by Ca, and growing the dielectric grains to a grain size of 0.35 to 0.65 μm, in the process of reducing the thickness of the dielectric layer to approx. 1 μm. In general, Mg is added as an acceptor element to suppress the reduction of dielectrics due to sintering. In Patent Literature 1, the content of MgO in the dielectrics is 0.05 to 3.0 mol per 100 mol of $Ba_{1-x}Ca_xTiO_3$.

PRIOR ART LITERATURE

Patent Literature

Patent Literature 1: Japanese Patent Laid-open No. 2010-180124

SUMMARY OF THE INVENTION

Problems to be Solved by the Invention

In the above, when the layer thickness of dielectrics is set to 1 μm or less in order to make the multi-layer ceramic capacitor smaller yet larger in capacitance, the MLCC assumes a state that more closely resembles the so-called one-layer-one-grain structure where the layer thickness of dielectrics is roughly equal to the grain size. The closer the MLCC is to the one-layer-one-grain structure, the fewer the grain boundaries between grains exist, which increases the probability of lower electrical insulation property or shorter life. This is because the grain boundary has higher insulation property than the dielectric grain and also because the grain boundary prevents movement of oxygen deficiencies occurring in the electrostatic field (electric field migration). On the other hand, suppressing the grain growth of dielectrics during sintering to keep the grain size small and thereby ensure sufficient grain boundary has a trade-off effect in that the dielectric constant will drop due to the sizing effect mentioned above.

The present invention was developed to solve these problems and an object is to provide a multi-layer ceramic capacitor that allows for high-density layering and still achieves improved reliability by means of suppressing the grain growth when the dielectric grains constituting the dielectric layers are sintered and thereby ensuring sufficient grain boundary, while also setting a high dielectric constant per unit grain size.

Means for Solving the Problems

The present invention is a multi-layer ceramic capacitor that contains a laminate constituted by dielectric layers and internal electrode layers alternately layered with one another, as well as cover layers formed as outermost layers at the top and bottom of the laminate in the layering direction, wherein the dielectric layers are constituted by a sintered compact that contains a mol of $ReO_{3/2}$, b mol of $SiO_2$, c mol of $MO_x$, d mol of $ZrO_2$ and e mol of MgO (where Re is a rare earth element, M is a metal element (except for Ba, Ti, Re, Si, Zr, Mg and rare earth elements), and x is a valance) per 100 mol of $BaTiO_3$, and a, b, c, d, and e mentioned above which indicate the mol numbers of respective constituents per 100 mol of $BaTiO_3$ are $0.1 \leq a \leq 1.0$, $0.1 \leq b \leq 1.5$, $0.1 \leq c \leq 0.4$, $0 \leq d \leq 1.0$, and $0 \leq e \leq 0.03$, respectively.

Additionally, the cover layers of the multi-layer ceramic capacitor may contain 2.0 mol or less of Mg per 100 mol of $BaTiO_3$.

Additionally, Re as mentioned above may be at least one type of rare earth metal selected from the group that includes Y, Eu, Gd, Dy, Ho, Er, and Yb, and is preferably at least one type of rare earth element selected from the group that includes Y, Ho, and Gd.

Additionally, M as mentioned above may be a metal element selected from Mn and/or V.

Additionally, the value of the specific dielectric constant per the average grain size of the dielectric grains constituting the dielectric layers may be 15 $nm^{-1}$ or more.

Additionally, the average grain size of the dielectric grains constituting the dielectric layers may be 500 nm or less.

Effects of the Invention

According to the present invention, sufficient grain boundary can be ensured by suppressing the grain growth when the dielectric layers are sintered, while a high dielectric constant can be set per unit grain size at the same time. This allows for high-density layering of a multilayer ceramic capacitor and still achieves improved reliability.

MODES FOR CARRYING OUT THE INVENTION

Figure 1:
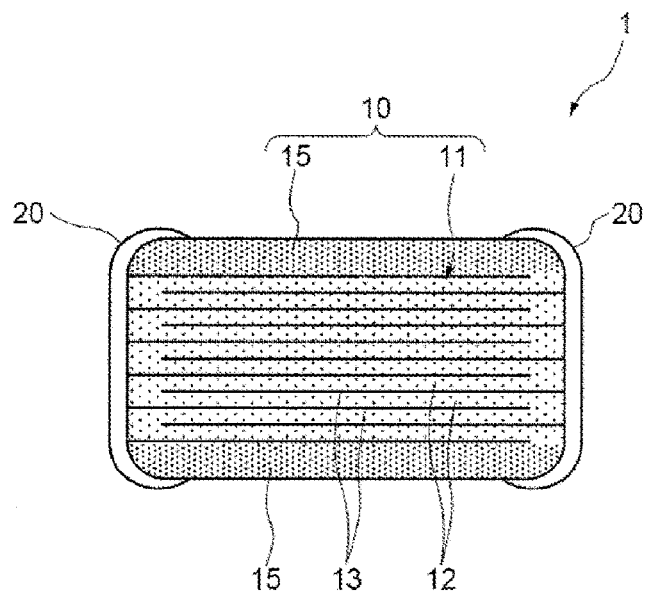
FIG. 1 is a schematic longitudinal section view of a multi-layer ceramic capacitor according to an embodiment of the present invention.

A multi-layer ceramic capacitor according to an embodiment of the present invention is explained below. FIG. 1 is a schematic longitudinal section view of a multi-layer ceramic capacitor 1. The multi-layer ceramic capacitor 1 is generally constituted by a ceramic sintered compact 10 of specified chip size and shape (such as rectangular solid of 1.0×0.5×0.5 mm) as well as a pair of external electrodes 20 formed on both sides of the ceramic sintered compact 10. The ceramic sintered compact 10 is made of $BaTiO_3$ (barium titanate) as its primary constituent, for example, and has a laminate 11 inside which is constituted by dielectric layers 12 and internal electrode layers 13 alternately layered with one another, as well as cover layers 15 formed as the outermost layers at the top and bottom in the layering direction.

The laminate 11 has a high-density multi-layer structure comprised of a total of several hundred layers, where the thickness of one dielectric layer 12 sandwiched by two internal electrode layers 13 is 1 μm or less (such as approx. 300 nm) according to the specifications of capacitance, required pressure resistance, etc. The cover layers 15 formed as the outermost layers of the laminate 11 protect the dielectric layers 12 and internal electrode layers 13 from moisture, contaminants and other external sources of contamination and thereby prevent their deterioration over time.

The multi-layer ceramic capacitor 1 is manufactured as follows, for example. First, a material powder of fine grains whose primary constituent is $BaTiO_3$ is wet-mixed with additive compounds, after which the mixture is dried and pulverized to prepare a dielectric material powder. The prepared dielectric material powder is wet-mixed with polyvinyl acetal resin and organic solvent, and the mixture is applied to form a band-shaped dielectric green sheet of 1 μm or less according to the doctor blade method, for example, and then dried. Thereafter, a conductive paste containing organic binder is screen-printed onto the surface of the dielectric green sheet to place an internal electrode layer 13 pattern. For the conductive paste, a metal powder such as Ni can be favorably used. It is also possible to have $BaTiO_3$ of 50 nm or less in grain size dispersed uniformly as a co-material.

Thereafter, a specified number of dielectric green sheets that have been stamped to a uniform size of 15 cm×15 cm, for example, are layered in such a way that the internal electrode layers 13 are staggered. Cover sheets that will become cover layers 15 are then pressure-bonded at the top and bottom of the layered dielectric green sheets and the layers are cut to a specified chip size (such as 1.0×0.5 mm), after which a conductive paste that will become external electrodes 20 is applied on both sides of the laminate and then dried. This way, a compact of multi-layer ceramic capacitor 1 is obtained.

The compact thus obtained is put in a $N_2$ ambience of approx. 350° C. to remove the binder, and then sintered for 10 minutes to 2 hours at 1220 to 1280° C. using a mixed gas of $N_2$, $H_2$ and $H_2O$ (where the partial oxygen pressure is approx. $1.0 \times 10^{-11}$ MPa). After the sintering, the compact is oxidized for approx. 1 hour in a $N_2$ ambience of approx. 1000° C., to obtain a multi-layer ceramic capacitor 1 whose dielectric-layer-constituting dielectric grains have been grown to a desired grain size (referring to the average grain size of sintered dielectric grains, in this Specification, as described later).

The multi-layer ceramic capacitor 1 is such that its dielectric layers 12 are constituted by a sintered compact that contains a mol of $ReO_{3/2}$, b mol of $SiO_2$, c mol of $MO_x$, d mol of $ZrO_2$ and e mol of MgO (where Re is a rare earth element, M is a metal element (except for Ba, Ti, Re, Si, Zr, Mg and rare earth elements), and x is a valance) per 100 mol of $BaTiO_3$. In the composition formula, the coefficients a, b, c, d, and e indicate mol numbers per 100 mol of $BaTiO_3$ being the primary constituent, and satisfy the relationships of $0.1 \le a \le 1.0$, $0.1 \le b \le 1.5$, $0.1 \le c \le 0.4$, $0 \le d \le 1.0$, and $0 \le e \le 0.03$, respectively. Preferably the mol number of MgO is in a range of $0.01 \le e \le 0.03$.

The content of Mg in the cover layers 15 may be 2.0 mol or less per 100 mol of $BaTiO_3$ contained in the cover layers 15.

Re (rare earth element) contained in the dielectric layers 12 may be at least one type selected from the group that includes Y (yttrium), Eu (europium), Gd (gadolinium), Dy (dysprosium), Ho (holmium), Er (erbium), and Yb (ytterbium), and is preferably at least one type selected from the group that includes Y, Ho, and Gd.

M (metal element) contained in the dielectric layers 12 may be selected from Mn (manganese) and/or V (vanadium).

According to the multi-layer ceramic capacitor 1 in this embodiment as produced under the above conditions, a value of 15 $nm^{-1}$ or more may be achieved as the specific dielectric constant per the average grain size of the dielectric grains constituting the dielectric layers 12. Additionally, the average grain size here may be adjusted to 500 nm or less.

EXAMPLES

Next, examples of the multi-layer ceramic capacitor (hereinafter referred to as "MLCC") proposed by the present invention are explained.
<Production of MLCC>
(1) Preparation of Dielectric Material Powder First, a high-purity $BaTiO_3$ powder of 110 nm in average grain size, as well as the compounds $ReO_{3/2}$, $SiO_2$, $MO_x$ (prepared as a $MnCO_3$ powder; will become MnO as $CO_2$ dissociates as a result of sintering), $ZrO_2$ and MgO as shown in Tables 1 to 7, were prepared as a material powder of dielectrics. The average grain size of the material powder was obtained by observing 500 powder samples of barium titanate using a scanning electron microscope (SEM) and taking the median size. Then, the respective compounds were weighed and blended so that the composition ratios shown in Tables 1 to 7 would be achieved by the dielectric layers of the obtained MLCCs, or specifically by the sintered compacts. The material powder of each sample thus blended was wet-mixed with water and then dried and dry-pulverized to prepare a dielectric material powder. Each dielectric material powder for cover layers was also prepared based on similar constituent compounds.

(2) Production of MLCC Compact

The prepared dielectric material powder was wet-mixed with polyvinyl acetal resin and organic solvent, after which the mixture was applied to form a ceramic green sheet of 1.0 μm in thickness according to the doctor blade method and then dried. Ceramic cover sheets for cover layers were prepared at a thickness of 10 μm. A Ni conductive paste was screen-printed onto the green sheet that would become a dielectric layer, according to a specified pattern, to place an internal electrode. One hundred and one such green sheets having an electrode pattern placed on them were layered so that the number of dielectric layers n became 100, and then 20 cover sheets of 10 μm in thickness each were pressure-bonded at the top and bottom of the laminate, respectively, after which the laminate was cut to 1.0×0.5 mm. Thereafter, a Ni conductive paste that would become external electrodes was applied on both sides of the laminate and then dried, to obtain a sample of MLCC compact.

(3) Sintering of MLCC Compact

The sample of MLCC compact was put in a $N_2$ ambience of approx. 350° C. to remove the binder. Thereafter, the sample was sintered for 10 minutes to 2 hours at 1220 to 1280° C. using a mixed gas of $N_2$, $H_2$ and $H_2O$ (where the partial oxygen pressure was approx. $1.0 \times 10^{-11}$ MPa). The sintering temperature and time were adjusted as deemed appropriate to achieve the target grain size (300 nm). After the sintering, the compact was oxidized for 1 hour in a $N_2$ ambience of 1000° C.

The MLCC thus obtained was evaluated for various properties as described later. When the cover layers were separated from each obtained MLCC and the MLCC without cover layers was pulverized and analyzed by means of ICP (inductively coupled plasma) analysis, thereby detecting the quantitative data of each dielectric layer constituent and then converting the quantitative data of each constituent to a mol number relative to the quantitative data of $BaTiO_3$, thus calculating the composition ratio of the constituent, it was confirmed that all composition ratios shown in Tables 1 to 7 were achieved. Also with respect to Mg contained in the cover layers, each separated cover layer was analyzed by means of ICP analysis and the quantitative data of MgO was converted to a mol number relative to the quantitative data of $BaTiO_3$, to find that all composition ratios shown in Tables 1 to 7 were achieved.

<MLCC Evaluation Methods>

(1) Method of Evaluation of Grain Size

Figure 2:
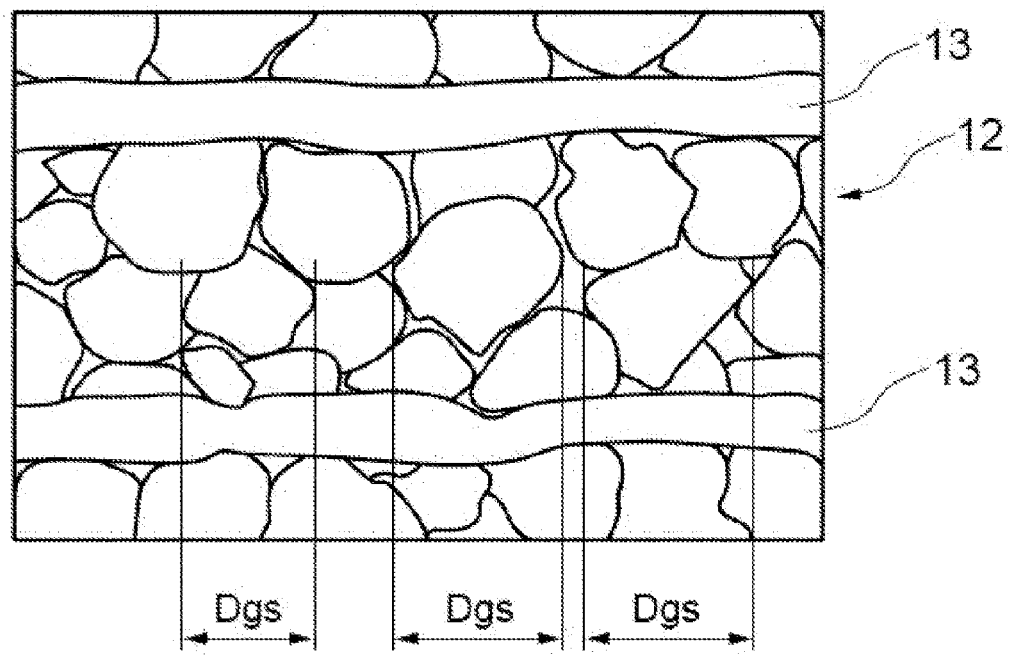
FIG. 2 is a section view of a dielectric layer presented to explain the grain size.

A partial section of the MLCC was polished and extracted, and based on a photograph capturing a section of the dielectric layer using a scanning electron microscope (SEM), the grain sizes of dielectric grains were measured. FIG. 2 is a schematic section view of the dielectric layer. In this Specification, the grain size is defined as the average maximum length of sintered dielectric grains in the direction parallel with the internal electrode layer (or specifically the direction orthogonal to the direction of electric field). In other words, the grain size Dg can be obtained by dividing the total sum of maximum lengths Dgs of sampled dielectric grains by the sample size, by referring to FIG. 2. With respect to sampling of dielectric grains whose grains size was measured, the sample size was set to 500 or more and when there were more than 500 grains in one observed area (such as on one SEM photograph of 2000 magnifications), all dielectric grains in that area were sampled; when there were fewer than 500 grains, multiple locations were observed (captured) until at least 500 grains were sampled. In addition, the MLCC was given preliminary heat treatment for 5 minutes at 1180° C. in the same ambience as used in the sintering process (mixed gas of $N_2$, $H_2$ and $H_2O$), to give thermal etching to the grain boundary so that the grain boundary line would be clearly captured by the SEM photograph.

(2) Method of Evaluation of Dielectric Constant

The sintered and oxidized MLCC was put in a thermostatic chamber of 150° C. and kept stationary for 1 hour, and then removed and kept stationary at room temperature of 25° C. for 24 hours to adjust the conditions, after which its capacitance Cm was measured using an impedance analyzer. Voltage was applied under the condition of 1 kHz and 1.0 Vrms for measurement. The specific dielectric constant $\in$ was obtained from the measured capacitance Cm using Formula (1) below:

$$Cm = \in \times \in_0 \times n \times S/t \quad \text{Formula (1)}$$

Here, $\in_0$ represents the dielectric constant in vacuum, while n, S, and t represent the number of dielectric layers, area of internal electrode layers, and thickness of one dielectric layer, respectively.

In these examples, the specific dielectric constant per unit grain size ($\in/Dg$) is adopted as the evaluation value for capacitance characteristics of each capacitor, as shown in Tables 1 to 7 below.

<MLCC Evaluation Results>

The evaluation results of the dielectric layers of the MLCCs produced according to the aforementioned conditions are explained by referring to Tables 1 to 7.

(1) Samples 1 to 12

TABLE 1

| Coefficient symbol Element | a: Re | b | c: M | | | d | e | Cover layer | Dg Grain | $\epsilon$ | $\epsilon/Dg$ Specific dielectric | *Out of |
|---|---|---|---|---|---|---|---|---|---|---|---|---|
| | | Si | Mn | V | Zr | Mg | | Mg | size | Specific | constant/ | specification |
| Sample number | Rare earth Element (mol) | (mol) | (mol) | (mol) | (mol) | (mol) | | (mol) | (nm) | dielectric constant (−) | Grain size (1/nm) | (Reference example) |
| 1 | Ho | 0.50 | 0.50 | 0.10 | 0.10 | 0.10 | | 0 | 0 | 314 | 8413 | 27 | |
| 2 | Ho | 0.50 | 0.50 | 0.10 | 0.10 | 0.10 | | 0 | 0 | 315 | 7163 | 23 | |
| 3 | Ho | 0.50 | 0.50 | 0.10 | 0.10 | 0.10 | | 0.01 | 0 | 311 | 8849 | 22 | |
| 4 | Ho | 0.50 | 0.50 | 0.10 | 0.10 | 0.10 | | 0.01 | 0 | 312 | 6234 | 20 | |
| 5 | Ho | 0.50 | 0.50 | 0.10 | 0.10 | 0.10 | | 0.02 | 0 | 315 | 6321 | 20 | |
| 6 | Ho | 0.50 | 0.50 | 0.10 | 0.10 | 0.10 | | 0.02 | 0 | 311 | 6211 | 20 | |
| 7 | Ho | 0.50 | 0.50 | 0.10 | 0.10 | 0.10 | | 0.03 | 0 | 312 | 5699 | 18 | |
| 8 | Ho | 0.50 | 0.50 | 0.10 | 0.10 | 0.10 | | 0.03 | 0 | 298 | 5680 | 18 | |
| 9 | Ho | 0.50 | 0.50 | 0.10 | 0.10 | 0.10 | | 0.03 | 0 | 322 | 5396 | 17 | |
| 10 | Ho | 0.50 | 0.50 | 0.10 | 0.10 | 0.10 | | 0.04 | 0 | 289 | 4703 | 16 | *Mg too much |
| 11 | Ho | 0.50 | 0.50 | 0.10 | 0.10 | 0.10 | | 0.04 | 0 | 287 | 4697 | 16 | *Mg too much |
| 12 | Ho | 0.50 | 0.50 | 0.10 | 0.10 | 0.10 | | 0.04 | 0 | 320 | 4440 | 14 | *Mg too much |

Samples 1 to 12 represent examples where the mol number e of added Mg (magnesium) was changed from 0 to 0.04 per 100 mol of $BaTiO_3$, with the mol number a of Re (rare earth, or specifically Ho (holmium)) fixed at 0.50, mol number b of Si (silicon) fixed at 0.50, mol number c of M (metal, or specifically Mg (manganese) and V (vanadium)) fixed at 0.20 (equally blended), and mol number d of Zr (zirconium) fixed at 0.10, as contained in other additives.

In Samples 1 to 9, the specific dielectric constant $\epsilon$ was greater than 5000 when the mol number e of Mg was in a range of $0 \leq e \leq 0.03$. The $\epsilon/Dg$ (specific dielectric constant relative to grain size) was also greater than 15 ($nm^{-1}$). In Samples 10 to 12 whose mol number e of Mn was in a range of $0.04 \leq e$, the specific dielectric constant $\epsilon$ was smaller than 5000.

(2) Samples 13 to 16

TABLE 2

| Coefficient symbol | | | | | | | | Cover | Dg | $\epsilon$ | $\epsilon/Dg$ Specific dielectric | *Out of |
|---|---|---|---|---|---|---|---|---|---|---|---|---|
| Element | a: Re | | b | c: M | | d | e | layer | Grain | Specific | constant/ | specification |
| Sample | Rare earth | | Si | Mn | V | Zr | Mg | Mg | size | dielectric | Grain size | Reference |
| number | Element | (mol) | (mol) | (mol) | (mol) | (mol) | (mol) | (mol) | (nm) | constant (–) | (1/nm) | example) |
| 13 | Ho | 0 | 0.50 | 0.10 | 0.10 | 0.10 | 0.01 | 0 | | Reduction | | *Re too little |
| 14 | Ho | 0.10 | 0.50 | 0.10 | 0.10 | 0.10 | 0.01 | 0 | 318 | 8604 | 27 | |
| 3 | Ho | 0.50 | 0.50 | 0.10 | 0.10 | 0.10 | 0.01 | 0 | 311 | 6849 | 22 | |
| 15 | Ho | 1.00 | 0.50 | 0.10 | 0.10 | 0.10 | 0.01 | 0 | 299 | 5042 | 17 | |
| 16 | Ho | 1.50 | 0.50 | 0.10 | 0.10 | 0.10 | 0.01 | 0 | 312 | 4569 | 15 | *Re too little |

Samples 13 to 16 represent examples where the mol number a of Re (Ho)

Samples 13 to 16 represent examples where the mol number a of Re (Ho) was changed from 0 to 1.50 per 100 mol of $BaTiO_3$, with the mol number b of Si fixed at 0.50, mol number c of M (Mn and V) fixed at 0.20 (equally blended), mol number d of Zr fixed at 0.10, and mol number e of Mg fixed at 0.01.

In Samples 14 and 15, the specific dielectric constant $\epsilon$ was greater than 5000, and the $\epsilon/Dg$ was also greater than 15 ($nm^{-1}$), when the mol number a of Re was in a range of $0.10 \leq a \leq 1.00$.

In Sample 13 whose mol number a of Re was 0, capacitance characteristics were lost due to accelerating semiconductorization caused by reduction. In Sample 16 whose mol number a of Re was 1.50, the specific dielectric constant $\epsilon$ was smaller than 5000.

(3) Samples 17 to 23

TABLE 3

| Coefficient symbol | | | | | | | | Cover | Dg | $\epsilon$ | $\epsilon/Dg$ Specific dielectric | *Out of |
|---|---|---|---|---|---|---|---|---|---|---|---|---|
| Element | a: Re | | b | c: M | | d | e | layer | Grain | Specific | constant/ | specification |
| Sample | Rare earth | | Si | Mn | V | Zr | Mg | Mg | size | dielectric | Grain size | Reference |
| number | Element | (mol) | (mol) | (mol) | (mol) | (mol) | (mol) | (mol) | (nm) | constant (–) | (1/nm) | example) |
| 17 | Ho | 0.50 | 0 | 0.10 | 0.10 | 0.10 | 0.01 | 0 | | Insufficient densification | | *Si too little |
| 18 | Ho | 0.50 | 0.01 | 0.10 | 0.10 | 0.10 | 0.01 | 0 | 303 | 7801 | 26 | |
| 19 | Ho | 0.50 | 0.25 | 0.10 | 0.10 | 0.10 | 0.01 | 0 | 305 | 8245 | 27 | |
| 3 | Ho | 0.50 | 0.50 | 0.10 | 0.10 | 0.10 | 0.01 | 0 | 311 | 6849 | 22 | |
| 20 | Ho | 0.50 | 0.75 | 0.10 | 0.10 | 0.10 | 0.01 | 0 | 311 | 7772 | 25 | |
| 21 | Ho | 0.50 | 1.00 | 0.10 | 0.10 | 0.10 | 0.01 | 0 | 291 | 6231 | 21 | |
| 22 | Ho | 0.50 | 1.50 | 0.10 | 0.10 | 0.10 | 0.01 | 0 | 294 | 5497 | 19 | |
| 23 | Ho | 0.50 | 2.00 | 0.10 | 0.10 | 0.10 | 0.01 | 0 | 321 | 4514 | 14 | *Si too little |

Samples 17 to 23 represent examples where the mol number b of Si was changed from 0 to 2.00 per 100 mol of $BaTiO_3$, with the mol number a of Re (Ho) fixed at 0.50, mol number c of M (Mn and V) fixed at 0.20 (equally blended), mol number d of Zr fixed at 0.10, and mol number e of Mg fixed at 0.01.

In Samples 18 to 22, the specific dielectric constant ∈ was greater than 5000, and the ∈/Dg was also greater than 15 ($nm^{-1}$), when the mol number b of Si was in a range of 0.10 b 1.50. In Sample 17 whose mol number b of Si was 0, the sintered compact was evaluated as lacking in densification. In Sample 23 whose mol number b of Si was 2.00, the specific dielectric constant ∈ was smaller than 5000.

(4) Samples 24 to 33

TABLE 4

| Coefficient symbol Element | a: Re | | b | c: M | | d | e | Cover layer | Dg Grain | ∈ Specific | ∈/Dg Specific dielectric constant/ | *Out of specification |
|---|---|---|---|---|---|---|---|---|---|---|---|---|
| Sample number | Rare earth Element | (mol) | Si (mol) | Mn (mol) | V (mol) | Zr (mol) | Mg (mol) | Mg (mol) | Size (nm) | dielectric constant (−) | Grain size (1/nm) | (Reference example) |
| 24 | Ho | 0.50 | 0.50 | 0 | 0 | 0.10 | 0.01 | 0 | | Reduction | 27 | *M(Metal) too little |
| 25 | Ho | 0.50 | 0.50 | 0.05 | 0 | 0.10 | 0.01 | 0 | | Reduction | 23 | *M(Metal) too little |
| 26 | Ho | 0.50 | 0.50 | 0 | 0.05 | 0.10 | 0.01 | 0 | | Reduction | 22 | *M(Metal) too little |
| 27 | Ho | 0.50 | 0.50 | 0.05 | 0.05 | 0.10 | 0.01 | 0 | 317 | 7962 | 20 | |
| 3 | Ho | 0.50 | 0.50 | 0.10 | 0.10 | 0.10 | 0.01 | 0 | 311 | 6849 | 20 | |
| 28 | Ho | 0.50 | 0.50 | 0.20 | 0.20 | 0.10 | 0.01 | 0 | 288 | 6871 | 20 | |
| 29 | Ho | 0.50 | 0.50 | 0.30 | 0.30 | 0.10 | 0.01 | 0 | 289 | 4780 | 18 | *M(Metal) too much |
| 30 | Ho | 0.50 | 0.50 | 0.40 | 0 | 0.10 | 0.01 | 0 | 312 | 5023 | 19 | |
| 31 | Ho | 0.50 | 0.50 | 0.50 | 0 | 0.10 | 0.01 | 0 | 277 | 3891 | 17 | *M(Metal) too much |
| 32 | Ho | 0.50 | 0.50 | 0 | 0.40 | 0.10 | 0.01 | 0 | 300 | 5206 | 16 | |
| 33 | Ho | 0.50 | 0.50 | 0 | 0.50 | 0.10 | 0.01 | 0 | 320 | 4249 | 14 | *M(Metal) too much |

Samples 24 to 33 represent examples where the mol number c of M (Mn and/or V) was changed from 0 to 0.50 per 100 mol of $BaTiO_3$, with the mol number a of Re (Ho) fixed at 0.50, mol number b of Si fixed at 0.50, mol number d of Zr fixed at 0.10, and mol number e of Mg fixed at 0.01.

In Samples 27, 28, 30, and 32 whose mol number c of M (Mn and/or V) was in a range of 0.10≤c≤0.40, the specific dielectric constant ∈ was greater than 5000, and the ∈/Dg was also greater than 15 ($nm^{-1}$). In Samples 24 to 26 whose mol number c of M was in a range of 0 to 0.05, capacitance characteristics were lost due to reduction. In Samples 29, 31, and 33 whose mol number c of M was in a range of 0.50 to 0.60, the specific dielectric constant ∈ was smaller than 5000.

(5) Samples 34 to 39

TABLE 5

| Coefficient symbol Element | a: Re | | b | c: M | | d | e | Cover layer | Dg | ∈ Specific | ∈/Dg Specific dielectric constant/ | *Out of specification |
|---|---|---|---|---|---|---|---|---|---|---|---|---|
| Sample number | Rare earth Element | (mol) | Si (mol) | Mn (mol) | V (mol) | Zr (mol) | Mg (mol) | Mg (mol) | Grain Size (nm) | dielectri constant (−) | Grain size (1/nm) | (Reference example) |
| 34 | Ho | 0.50 | 0.50 | 0.10 | 0.10 | 0 | 0.01 | 0 | 309 | 8551 | 28 | |
| 3 | Ho | 0.50 | 0.50 | 0.10 | 0.10 | 0.10 | 0.01 | 0 | 311 | 6849 | 22 | |
| 35 | Ho | 0.50 | 0.50 | 0.10 | 0.10 | 0.25 | 0.01 | 0 | 318 | 8019 | 25 | |
| 36 | Ho | 0.50 | 0.50 | 0.10 | 0.10 | 0.50 | 0.01 | 0 | 294 | 8026 | 27 | |
| 37 | Ho | 0.50 | 0.50 | 0.10 | 0.10 | 0.75 | 0.01 | 0 | 298 | 6093 | 20 | |
| 38 | Ho | 0.50 | 0.50 | 0.10 | 0.10 | 1.00 | 0.01 | 0 | 309 | 5158 | 17 | |
| 39 | Ho | 0.50 | 0.50 | 0.10 | 0.10 | 1.25 | 0.01 | 0 | 315 | 4668 | 15 | *Zr too much |

Samples 34 to 39 represent examples where the mol number d of Zr was changed from 0 to 1.25 per 100 mol of BaTiO$_3$, with the mol number a of Re (Ho) fixed at 0.50, mol number b of Si fixed at 0.50, mol number c of M (Mn and V) fixed at 0.20 (equally blended), and mol number e of Mg fixed at 0.01.

In Samples 34 to 38, the specific dielectric constant ∈ was greater than 5000, and the ∈/Dg was also greater than 15 (nm$^{-1}$), when the mol number d of Zr was in a range of 0≤d≤1.00. In Sample 39 whose mol number d of Zr was 1.25, the specific dielectric constant ∈ was smaller than 5000.

(6) Samples 40 to 47 equally blending the elements Ho, Gd, Er and Yb (each at a mol number of 0.25), with the quantitative composition ratios of other constituents adjusted to the same conditions as in Samples 40 to 45.

In all of Samples 40 to 45, the specific dielectric constant ∈ was greater than 5000, and the ∈/Dg was also greater than 15 (nm$^{-1}$). In particular, it was revealed that a relatively high dielectric constant could be achieved by selecting rare earth

TABLE 6

| Coefficient symbol | | | | | | | | Cover layer | Dg Grain | ϵ Specific | ϵ/Dg Specific dielectric constant/ | *Out of specification |
|---|---|---|---|---|---|---|---|---|---|---|---|---|
| Element | a: Re | | b | c: M | | d | e | | | | | |
| | | | Si | Mn | V | Zr | Mg | Mg | Size | dielectric | Grain size | (Reference |
| Sample number | Rare earth Element | (mol) | (mol) | (mol) | (mol) | (mol) | (mol) | (mol) | (nm) | constant (−) | (1/nm) | example) |
| 40 | Y | 0.50 | 0.50 | 0.10 | 0.10 | 0.10 | 0.01 | 0 | 322 | 8509 | 26 | |
| 41 | Eu | 0.50 | 0.50 | 0.10 | 0.10 | 0.10 | 0.01 | 0 | 298 | 7699 | 26 | |
| 42 | Gd | 0.50 | 0.50 | 0.10 | 0.10 | 0.10 | 0.01 | 0 | 309 | 7925 | 26 | |
| 43 | Dy | 0.50 | 0.50 | 0.10 | 0.10 | 0.10 | 0.01 | 0 | 318 | 7606 | 24 | |
| 44 | Er | 0.50 | 0.50 | 0.10 | 0.10 | 0.10 | 0.01 | 0 | 278 | 6791 | 24 | |
| 45 | Yb | 0.50 | 0.50 | 0.10 | 0.10 | 0.10 | 0.01 | 0 | 281 | 5884 | 21 | |
| 46 | Ho, Dy | 0.25 each | 0.50 | 0.10 | 0.10 | 0.10 | 0.01 | 0 | 314 | 7865 | 25 | |
| 47 | Ho, Gd, Er, Yb | 0.25 each | 0.50 | 0.10 | 0.10 | 0.10 | 0.01 | 0 | 294 | 5212 | 18 | |

Samples 40 to 45 represent examples where the mol number a of Re (rare earth) was set to 0.50, mol number b of Si set to 0.50, mol number c of M (Mn and V) set to 0.20 (equally blended), mol number d of Zr set to 0.10, and mol number e of Mg set to 0.01, per 100 mol of BaTiO$_3$, with the type of Re changed to Y (yttrium), Eu (europium), Gd (gadolinium), Dy (dysprosium), Er (erbium), and Yb (ytterbium), respectively. Sample 46 represents an example where, under the same conditions with respect to the quantitative composition ratios of constituents as in Samples 40 to 45, Re (rare earth) was given by equally blending two types of elements, or specifically Ho and Dy (each at a mol number of 0.25). Sample 47 represents an example where Re (rare earth) was given by elements such as Ho (Samples 34 to 38), Y (Sample 40), Eu (Sample 41) and Gd (Sample 42), as deemed appropriate.

(7) Samples 48 to 52

TABLE 7

| Coefficient symbol | | | | | | | | Cover layer | Dg Grain | ϵ Specific | ϵ/Dg Specific dielectric constant/ | *Out of specification |
|---|---|---|---|---|---|---|---|---|---|---|---|---|
| Element | a: Re | | b | c: M | | d | e | | | | | |
| | | | Si | Mn | V | Zr | Mg | Mg | Size | dielectric | Grain size | (Reference |
| Sample number | Rare earth Element | (mol) | (mol) | (mol) | (mol) | (mol) | (mol) | (mol) | (nm) | constant (−) | (1/nm) | example) |
| 3 | Ho | 0.50 | 0.50 | 0.10 | 0.10 | 0.10 | 0.01 | 0 | 311 | 6849 | 22 | |
| 48 | Ho | 0.50 | 0.50 | 0.10 | 0.10 | 0.10 | 0.01 | 0.50 | 319 | 8530 | 27 | |
| 49 | Ho | 0.50 | 0.50 | 0.10 | 0.10 | 0.10 | 0.01 | 1.00 | 305 | 7706 | 25 | |
| 50 | Ho | 0.50 | 0.50 | 0.10 | 0.10 | 0.10 | 0.01 | 1.50 | 291 | 7465 | 26 | |
| 51 | Ho | 0.50 | 0.50 | 0.10 | 0.10 | 0.10 | 0.01 | 2.00 | 303 | 5511 | 18 | |
| 52 | Ho | 0.50 | 0.50 | 0.10 | 0.10 | 0.10 | 0.01 | 2.50 | 286 | 4403 | 15 | *Too much Mg in cover layers |

In Samples 48 to 52, the mol number a of Re (Ho) was fixed at 0.50, mol number b of Si fixed at 0.50, mol number c of M (Mn and V) fixed at 0.20 (equally blended), mol number d of Zr fixed at 0.1, and mol number e of Mg fixed at 0.01, per 100 mol of BaTiO$_3$, with only the mol number of Mg in the cover layers increased from 0.5 to 2.50.

In Samples 48 to 51, the specific dielectric constant ∈ was greater than 5000, and the ∈/Dg was also greater than 15 (nm$^{-1}$), when the mol number of Mg in the cover layers was in a range of 2.00 or less. In Sample 52 whose mol number of Mg in the cover layers was 2.50, the specific dielectric constant $\in$ was smaller than 5000.

(8) Examples of Other Grain sizes

Figure 3:
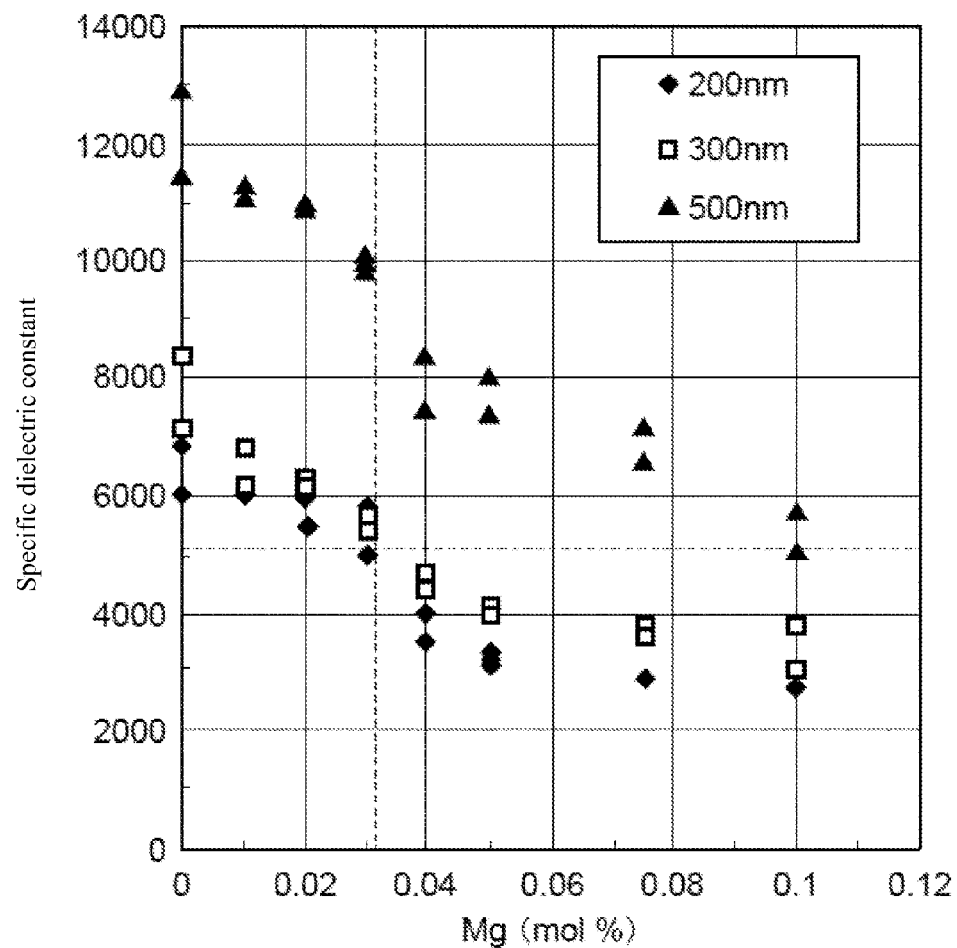
FIG. 3 is a graph showing the relationship between the content of Mg and specific dielectric constant.
Figure 4:
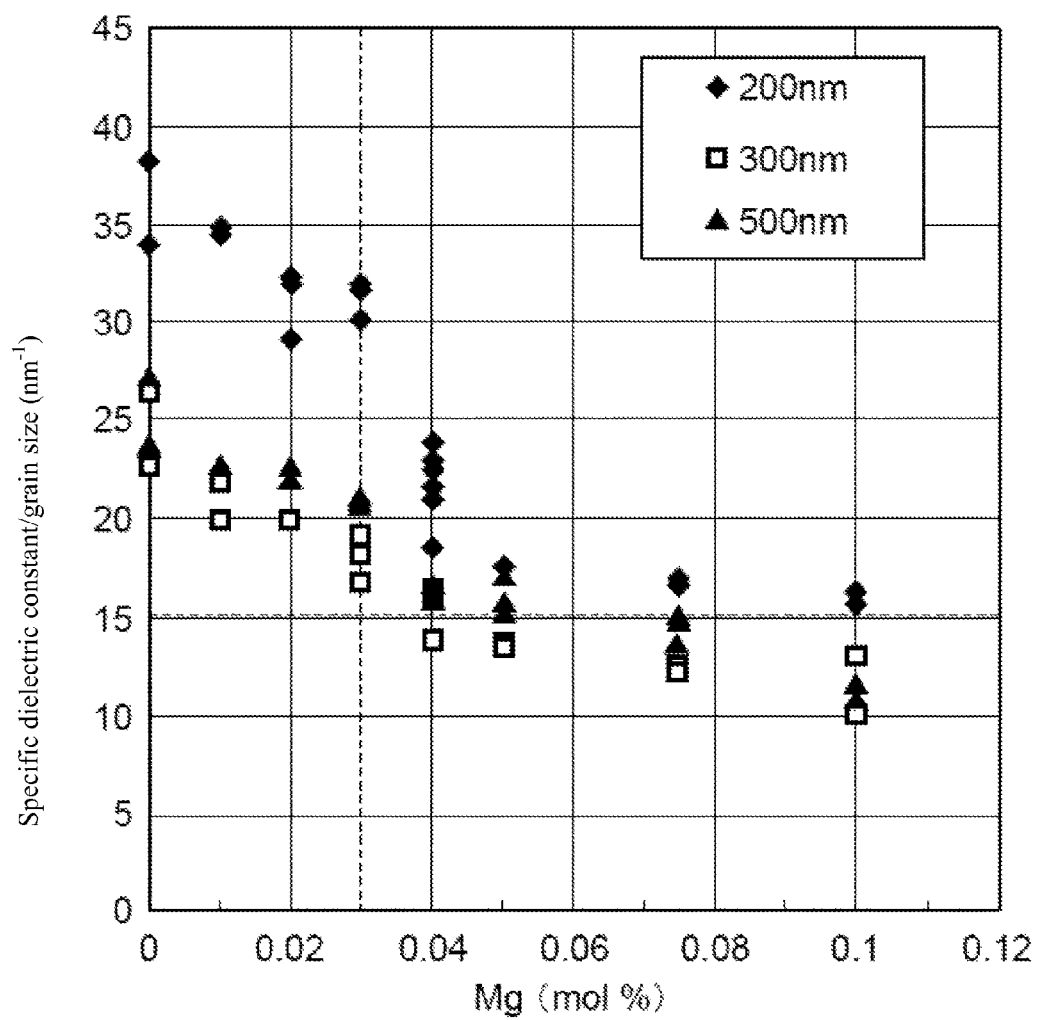
FIG. 4 is a graph showing the relationship between the content of Mg and specific dielectric constant, based on the vertical axis of FIG. 3 converted to the specific dielectric constant relative to the grain size.

The relationship between the additive quantity of Mg and specific dielectric constant was also examined for samples whose grains were grown by setting the target grain size to 200 nm and 500 nm, respectively. FIG. 3 is a graph plotting the measured values of Mg content and specific dielectric constant, respectively, with respect to the grain size (200 nm, 300 nm, 500 nm) being a parameter. FIG. 4 is a graph relating to FIG. 3, where the vertical axis in FIG. 3 is converted to the specific dielectric constant relative to grain size ($\in$/Dg) for evaluation. In FIGS. 3 and 4, the symbol ♦ represents the measured value at a grain size of 200 nm, symbol ☐ represents the measured value at a grain size of 300 nm, and symbol ▲ represents the measured value at a grain size of 500 nm.

As shown in FIGS. 3 and 4, the specific dielectric constant $\in$ was greater than 5000, and the specific dielectric constant relative to grain size $\in$/Dg was also greater than 15 (nm$^{-1}$), regardless of whether the grain size was 200 nm, 300 nm or 500 nm, when the compositional mol number e of Mg was in a range of $0 \leq e \leq 0.03$.

Figure 5:
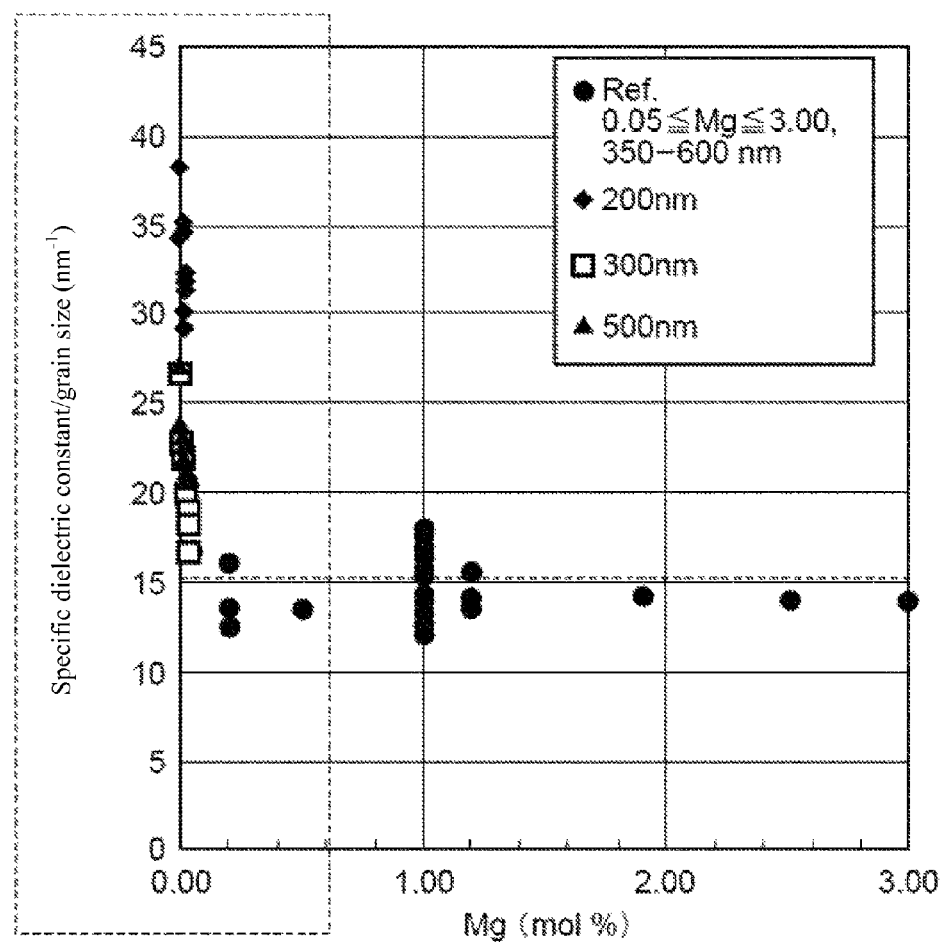
FIG. 5 is a graph showing the relationship of the specific dielectric constant relative to the grain size over an extended range of Mg content for comparison.
Figure 6:
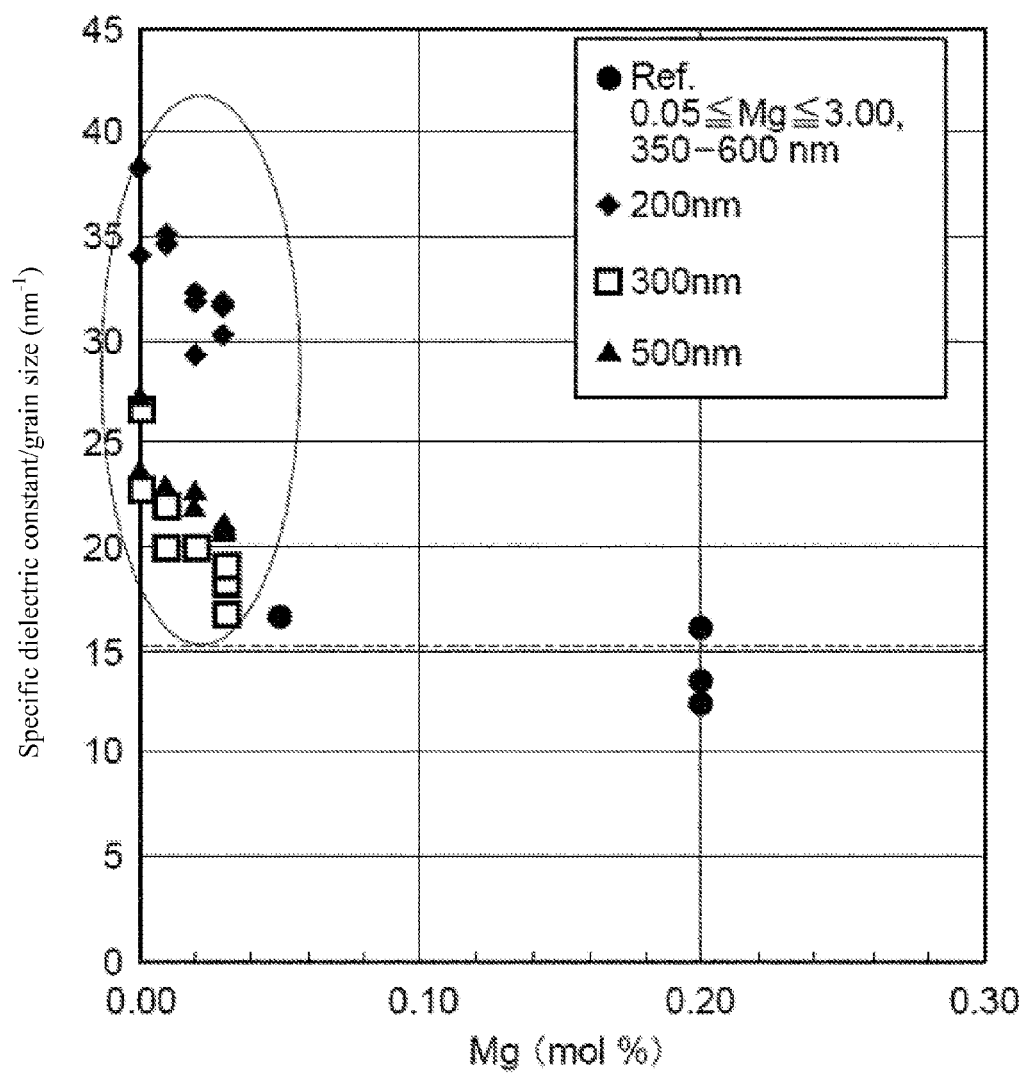
FIG. 6 is a graph showing in detail the relationship of the specific dielectric constant relative to the grain size over the range indicated by the broken line in FIG. 5.

(9) Comparison Against Reference Examples Based on Other Composition Ratio Conditions FIG. 5 is a graph relating to FIG. 4, plotting the relationship of the specific dielectric constant relative to grain size ($\in$/Dg) over an extended range of 0 to 3.00 mol of the compositional quantity of Mg. Furthermore, FIG. 6 is a graph showing the characteristic trend in detail over the range indicated by the broken line in FIG. 5. In FIGS. 5 and 6, the symbol ● represents the measured value in any of the comparative examples (Mg content of 0.05 mol$\leq$Mg$<$3.00 mol and grain size of 350 to 600 nm), symbol ♦ represents the measured value at a grain size of 200 nm, symbol ☐ represents the measured value at a grain size of 300 nm, and symbol ▲ represents the measured value at a grain size of 500 nm.

As shown in FIG. 5, it was revealed that the specific dielectric constant relative to grain size $\in$/Dg would virtually lock at or around 15 (nm$^{-1}$) when the additive quantity of Mg was increased until its compositional mol quantity e became greater than 0.03. In other words, any impact on the dielectric constant of the dielectrics is negligibly small when the mol number e of Mg is greater than 0.03.

On the other hand, it was revealed that, as shown in FIG. 6, the smaller the content of Mg, the more markedly the dielectric constant per unit grain size would improve when the mol number e of Mg was in a range of 0.03 or smaller. In other words, minimizing the additive quantity of Mg would contribute to the ensuring of sufficient dielectric constant.

Figure 7:
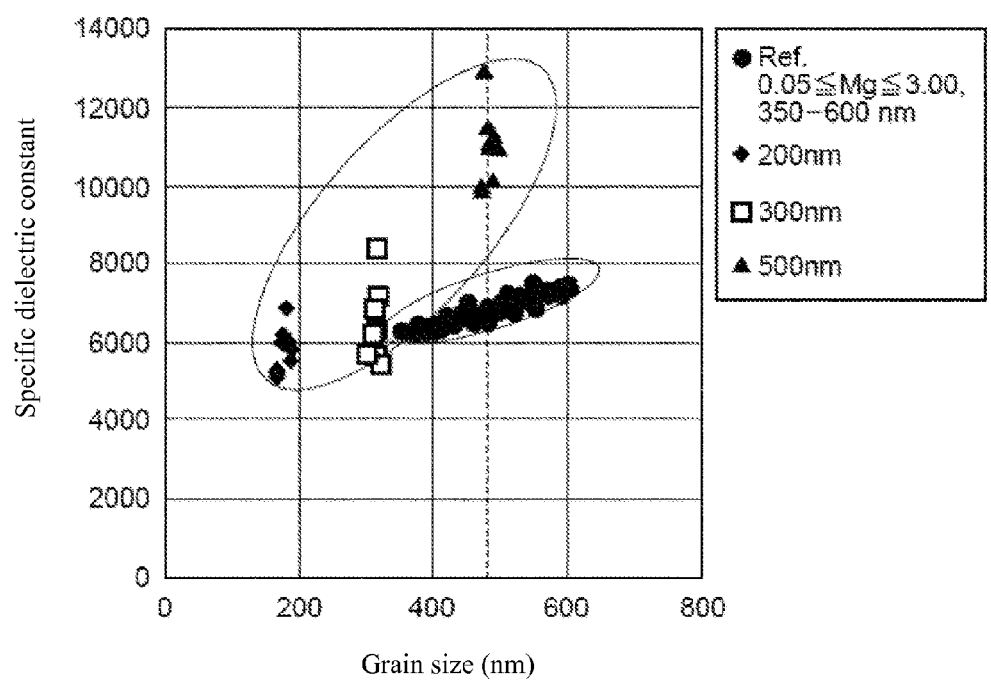
FIG. 7 is a graph showing the relationship between the grain size and specific dielectric constant for each of the examples of the present invention (where the mol number e of Mg is in a range of $0 \le e \le 0.03$) and comparative examples (where the mol number e of Mg is in a range of $0.05 \le e \le 3.00$).

FIG. 7 is a graph showing the relationship between the grain size and specific dielectric constant for each of the examples of the present invention where the mol number e of Mg is in a range of $0 \leq e \leq 0.03$, and comparative examples where the mol number e of Mg is in a range of $0.05 \leq e \leq 3.00$. In FIG. 7, the symbol ● represents the measured value in any of the comparative examples (Mg content of 0.05 mol$\leq$Mg$<$3.00 mol and grain size of 350 to 600 nm), symbol ♦ represents the measured value at a grain size of 200 nm, symbol ☐ represents the measured value at a grain size of 300 nm, and symbol ▲ represents the measured value at a grain size of 500 nm. As shown in FIG. 7, higher dielectric constants can be ensured in the examples of the present invention so long as the grain size of the dielectrics is the same. To ensure sufficient grain boundary and improve reliability, preferably e is adjusted to a range of $0.01 \leq e \leq 0.03$.

DESCRIPTION OF THE SYMBOLS

1 Multi-layer ceramic capacitor
10 Ceramic sintered compact
11 Laminate
12 Dielectric layer
13 Internal electrode layer
15 Cover layer
20 External electrode

The invention claimed is:

1. A multi-layer ceramic capacitor that contains a laminate constituted by dielectric layers and internal electrode layers alternately layered with one another, as well as cover layers formed as outermost layers at a top and bottom of the laminate in a layering direction, wherein:

the dielectric layers are constituted by a sintered compact that contains a mol of ReO$_{3/2}$, b mol of SiO$_2$, c mol of MO$_x$, d mol of ZrO$_2$, and e mol of MgO (where Re is a rare earth element, M is a metal element (except for Ba, Ti, Si, Zr, Mg and rare earth elements), and x is a valance) per 100 mol of BaTiO$_3$; and a, b, c, d, and e mentioned above which indicate mol numbers of respective constituents per 100 mol of BaTiO$_3$ are as follows:

$0.1 \leq a \leq 1.0$,
$0.1 \leq b \leq 1.5$,
$0.1 \leq c \leq 0.4$,
$0 \leq d \leq 1.0$, and
$0 \leq e \leq 0.03$.

2. A multi-layer ceramic capacitor according to claim 1, wherein the cover layers contain 2.0 mol or less of Mg per 100 mol of BaTiO$_3$.

3. A multi-layer ceramic capacitor according to claim 1, wherein Re as mentioned above is at least one rare earth element selected from the group consisting of Y, Eu, Gd, Dy, Ho, Er and Yb.

4. A multi-layer ceramic capacitor according to claim 3, wherein Re as mentioned above is at least one rare earth element selected from the group consisting of Y, Ho and Gd.

5. A multi-layer ceramic capacitor according to claim 1, wherein aforesaid M is a metal element selected from Mn and/or V.

6. A multi-layer ceramic capacitor according to claim 1, wherein a value of a specific dielectric constant per an average grain size of dielectric grains constituting the dielectric layers is 15 nm$^{-1}$ or more.

7. A multi-layer ceramic capacitor according to claim 1, wherein an average grain size of dielectric grains constituting the dielectric layers is 500 nm or less.

8. A multi-layer ceramic capacitor according to claim 1, wherein a mol number e of MgO in the dielectric layers is in a range of $0.01 \leq e \leq 0.03$.

9. A multi-layer ceramic capacitor according to claim 2, wherein Re as mentioned above is at least one rare earth element selected from the group consisting of Y, Eu, Gd, Dy, Ho, Er and Yb.

10. A multi-layer ceramic capacitor according to claim 9, wherein Re as mentioned above is at least one rare earth element selected from the group consisting of Y, Ho and Gd.

11. A multi-layer ceramic capacitor claim 2, wherein aforesaid M is a metal element selected from Mn and/or V.

12. A multi-layer ceramic capacitor claim 3, wherein aforesaid M is a metal element selected from Mn and/or V.

13. A multi-layer ceramic capacitor according to claim 2, wherein a value of a specific dielectric constant per an average grain size of dielectric grains constituting the dielectric layers is 15 nm$^{-1}$ or more.

14. A multi-layer ceramic capacitor according to claim 3, wherein a value of a specific dielectric constant per an average grain size of dielectric grains constituting the dielectric layers is 15 nm$^{-}$ or more.

15. A multi-layer ceramic capacitor according to claim 2, wherein an average grain size of dielectric grains constituting the dielectric layers is 500 nm or less.

16. A multi-layer ceramic capacitor according to claim 3, wherein an average grain size of dielectric grains constituting the dielectric layers is 500 nm or less.

17. A multi-layer ceramic capacitor according to claim 2, wherein a mol number e of MgO in the dielectric layers is in a range of $0.01 \leq e \leq 0.03$.

18. A multi-layer ceramic capacitor according to claim 3, wherein a mol number e of MgO in the dielectric layers is in a range of $0.01 \leq e \leq 0.03$.

* * * * *

UNITED STATES PATENT AND TRADEMARK OFFICE
CERTIFICATE OF CORRECTION

PATENT NO. : 9,287,046 B2
APPLICATION NO. : 14/389287
DATED : March 15, 2016
INVENTOR(S) : Koichiro Morita, Tetsuo Shimura and Kunihiko Nagaoka Page 1 of 1

It is certified that error appears in the above-identified patent and that said Letters Patent is hereby corrected as shown below:

Claims

At column 15, line 8, in Claim 14, please delete "15 nm-" and insert therefor --15 $nm^{-1}$--.

Signed and Sealed this
Seventeenth Day of May, 2016

Michelle K. Lee
*Director of the United States Patent and Trademark Office*